R. SCOTT.
APPARATUS PARTICULARLY SUITABLE FOR TREATING OIL SEED AND THE LIKE.
APPLICATION FILED FEB. 13, 1912.
1,040,782.
Patented Oct. 8, 1912.
10 SHEETS—SHEET 2.
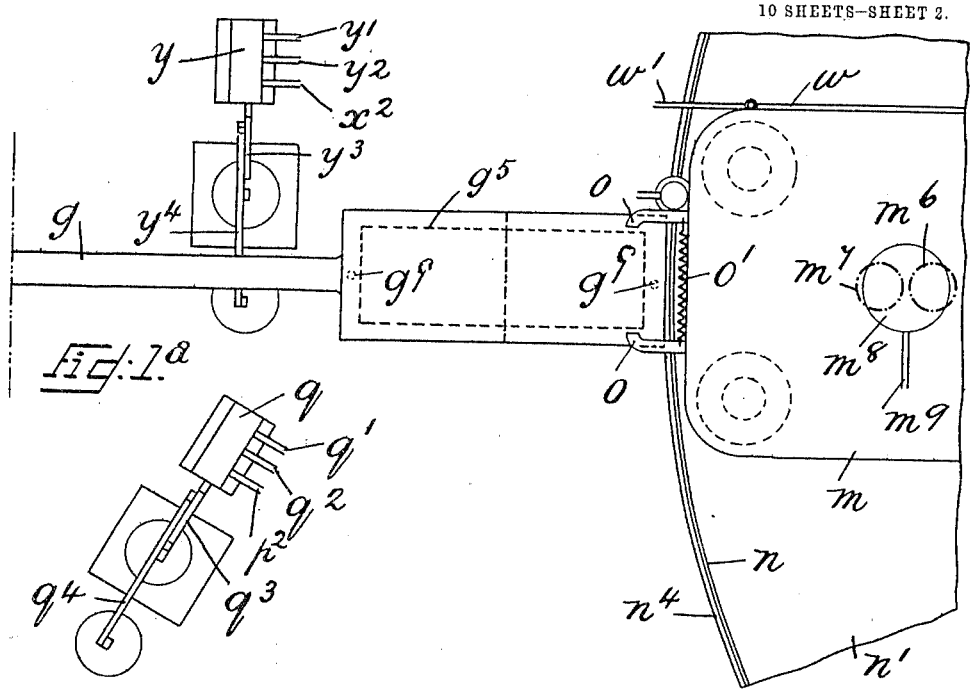
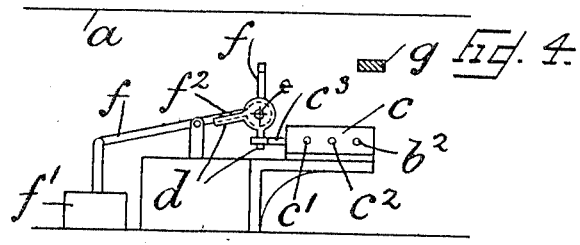
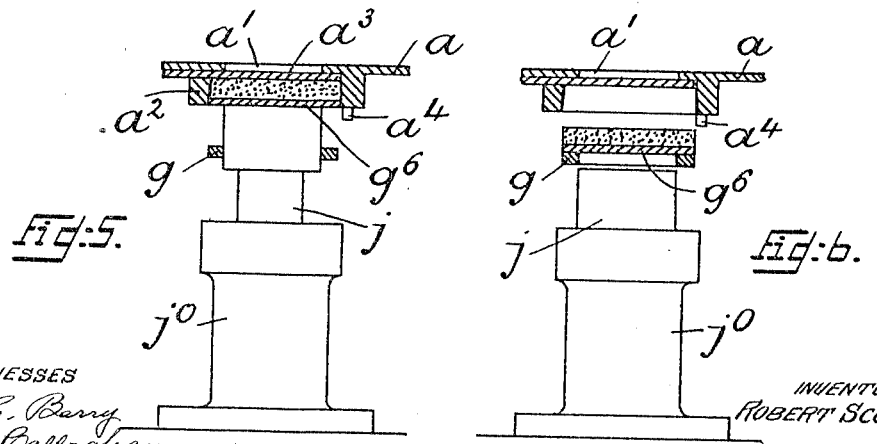

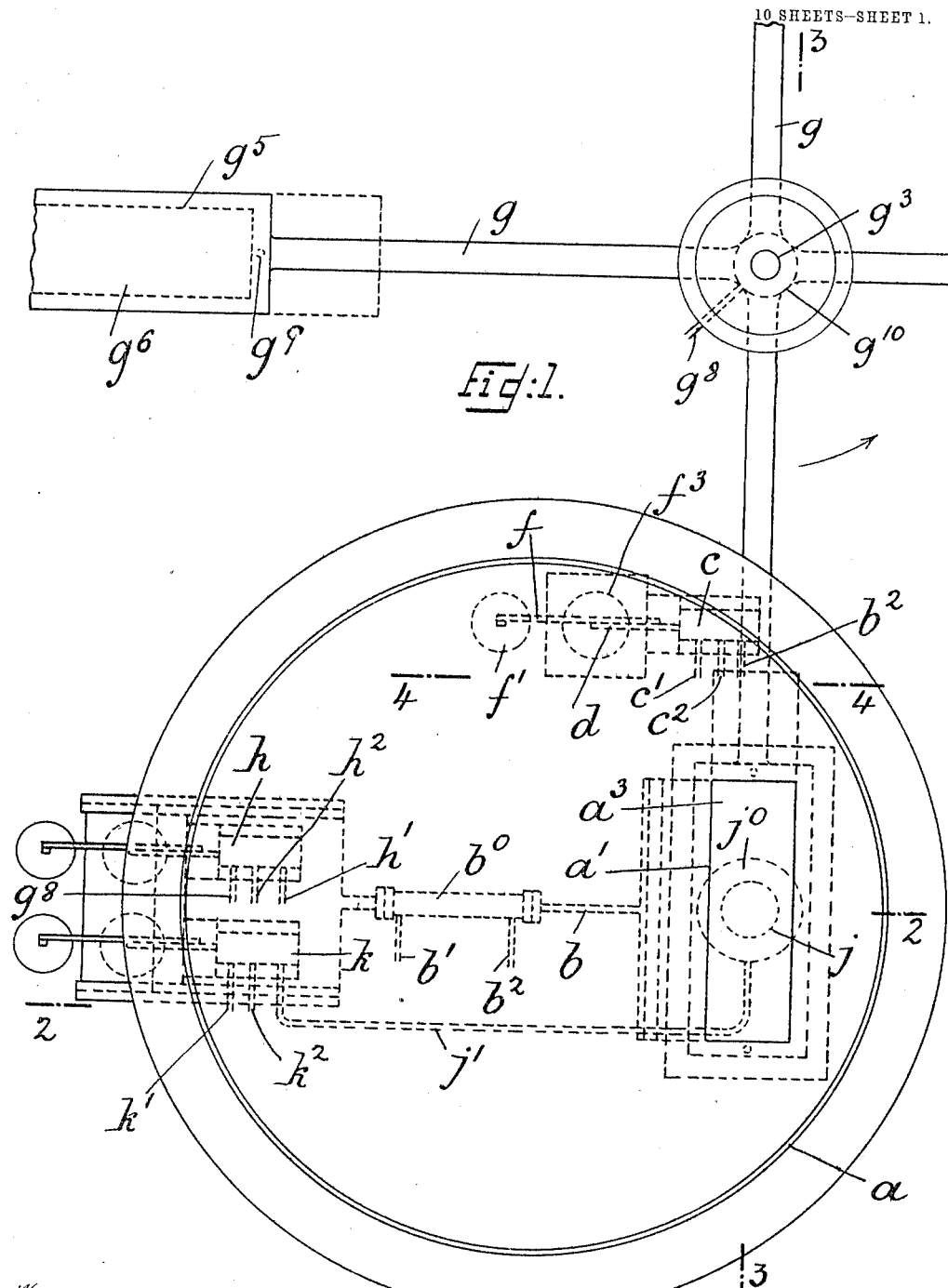

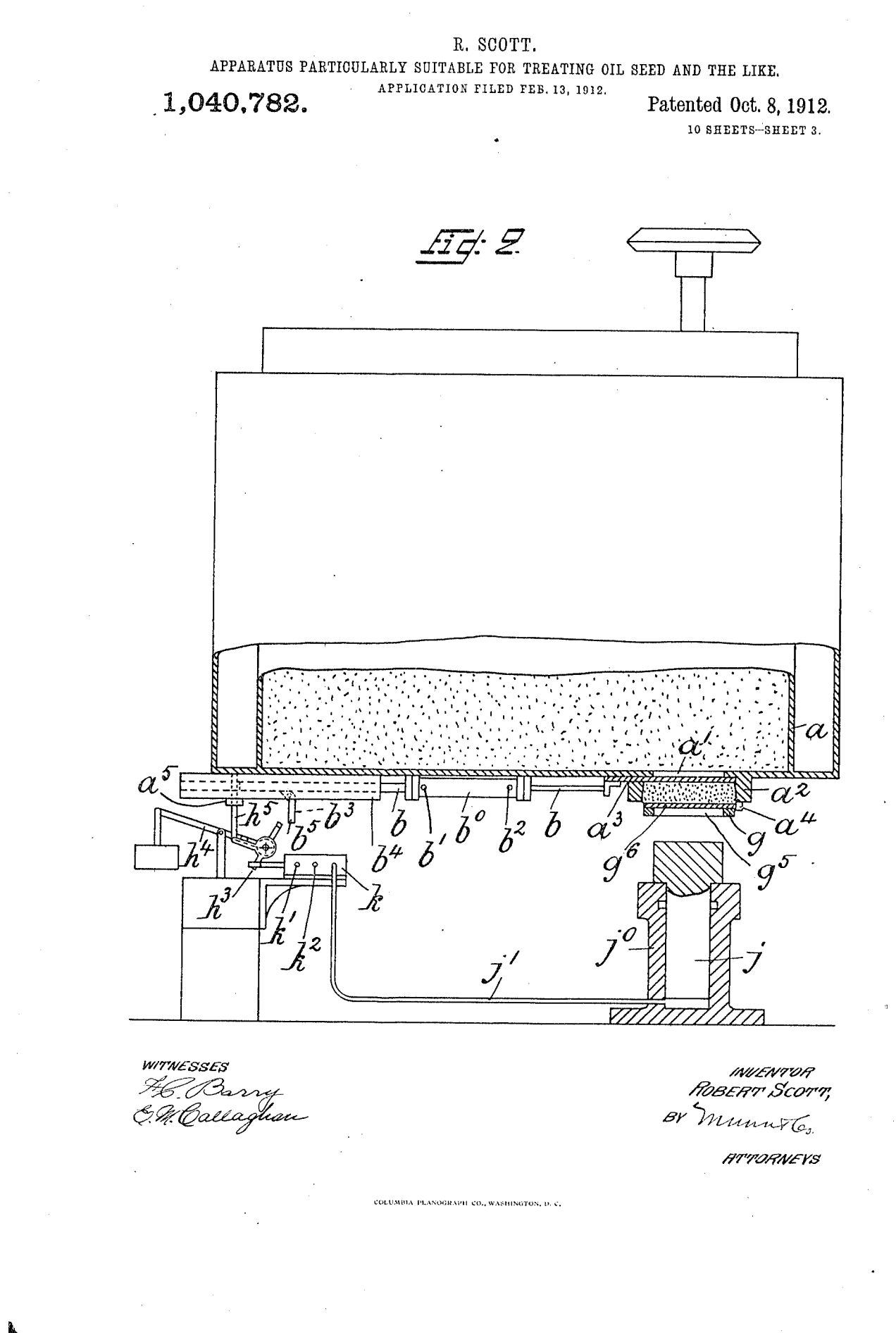

R. SCOTT.
APPARATUS PARTICULARLY SUITABLE FOR TREATING OIL SEED AND THE LIKE.
APPLICATION FILED FEB. 13, 1912.

1,040,782.

Patented Oct. 8, 1912.

10 SHEETS—SHEET 3.

Fig. 2

WITNESSES
H. C. Barry
E. W. Callaghan

INVENTOR
ROBERT SCOTT,
BY Munn & Co.
ATTORNEYS

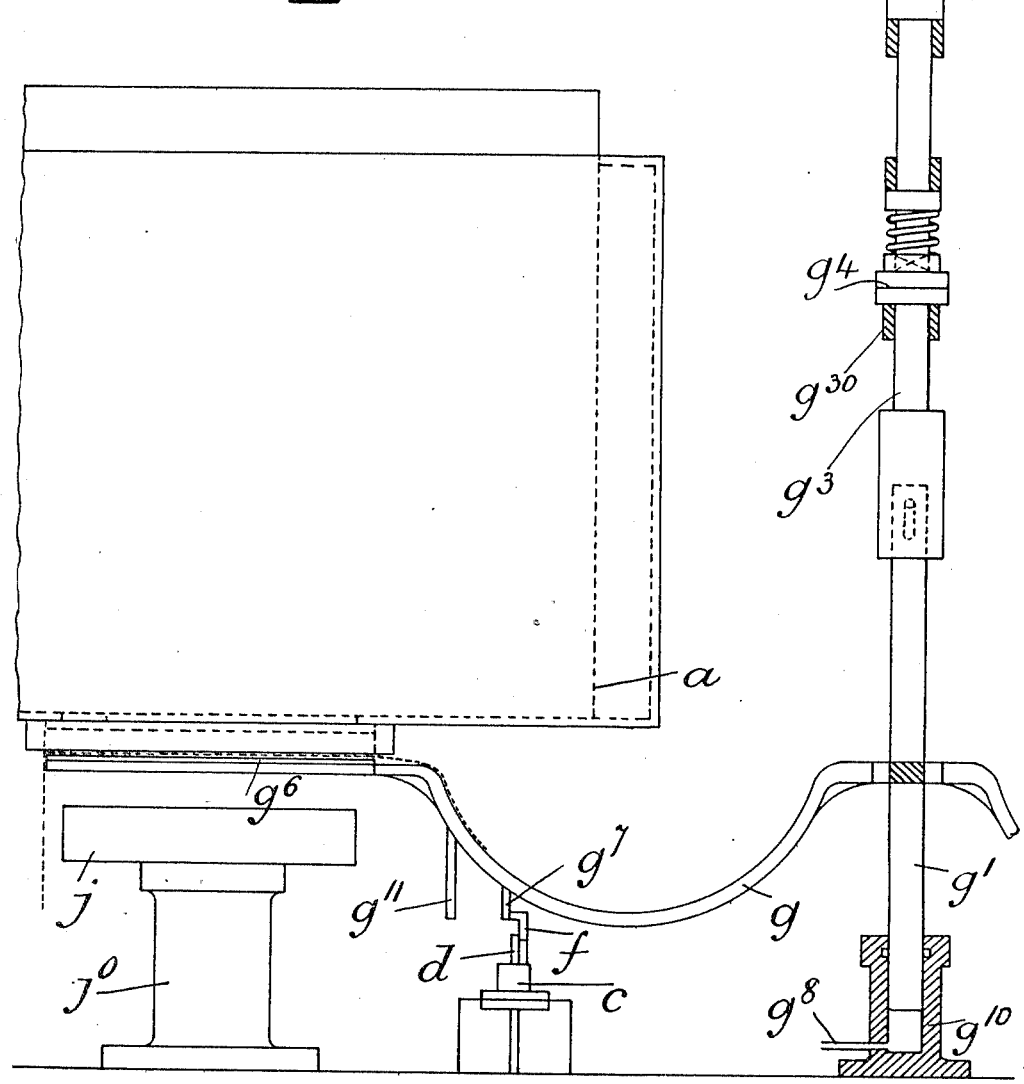

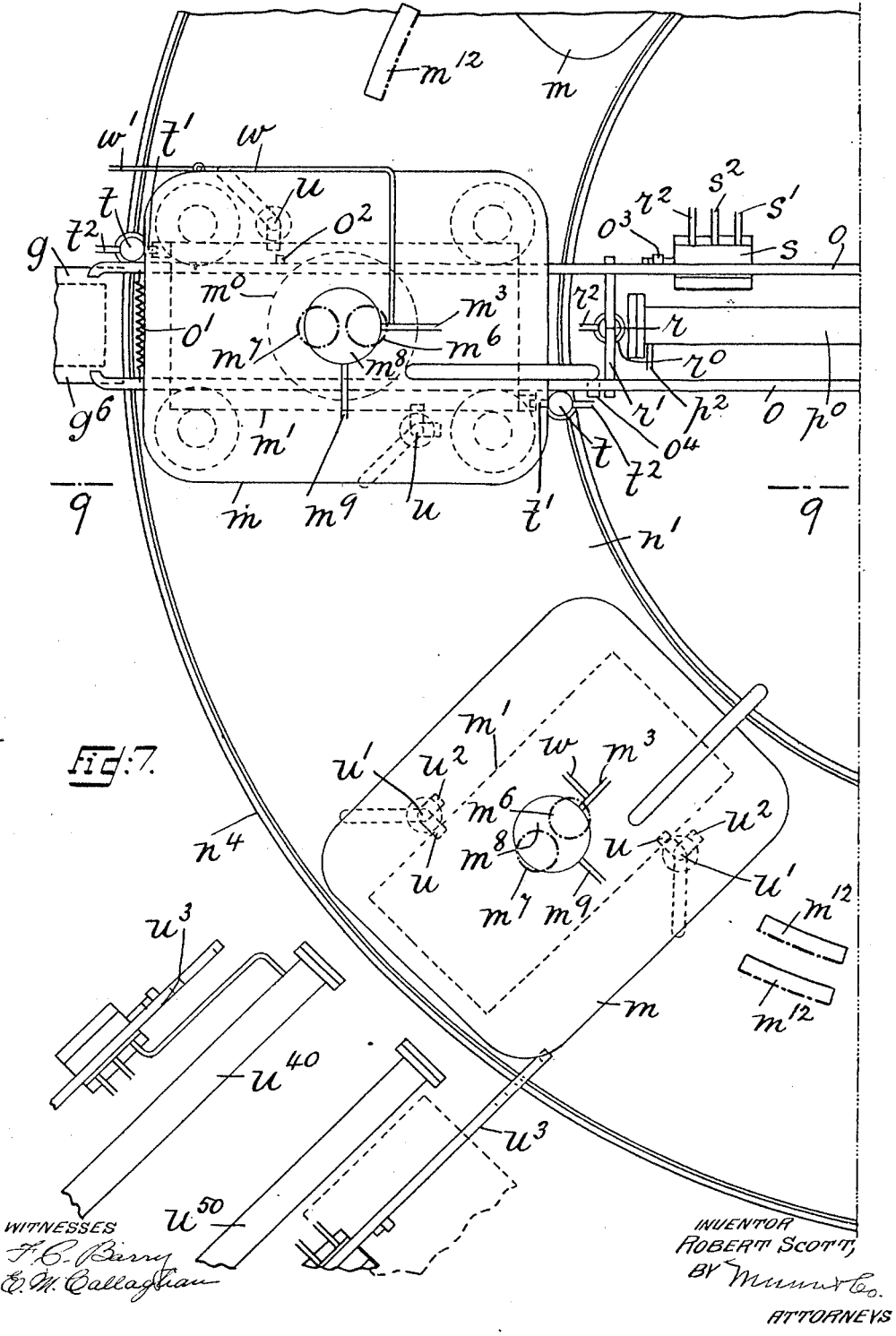

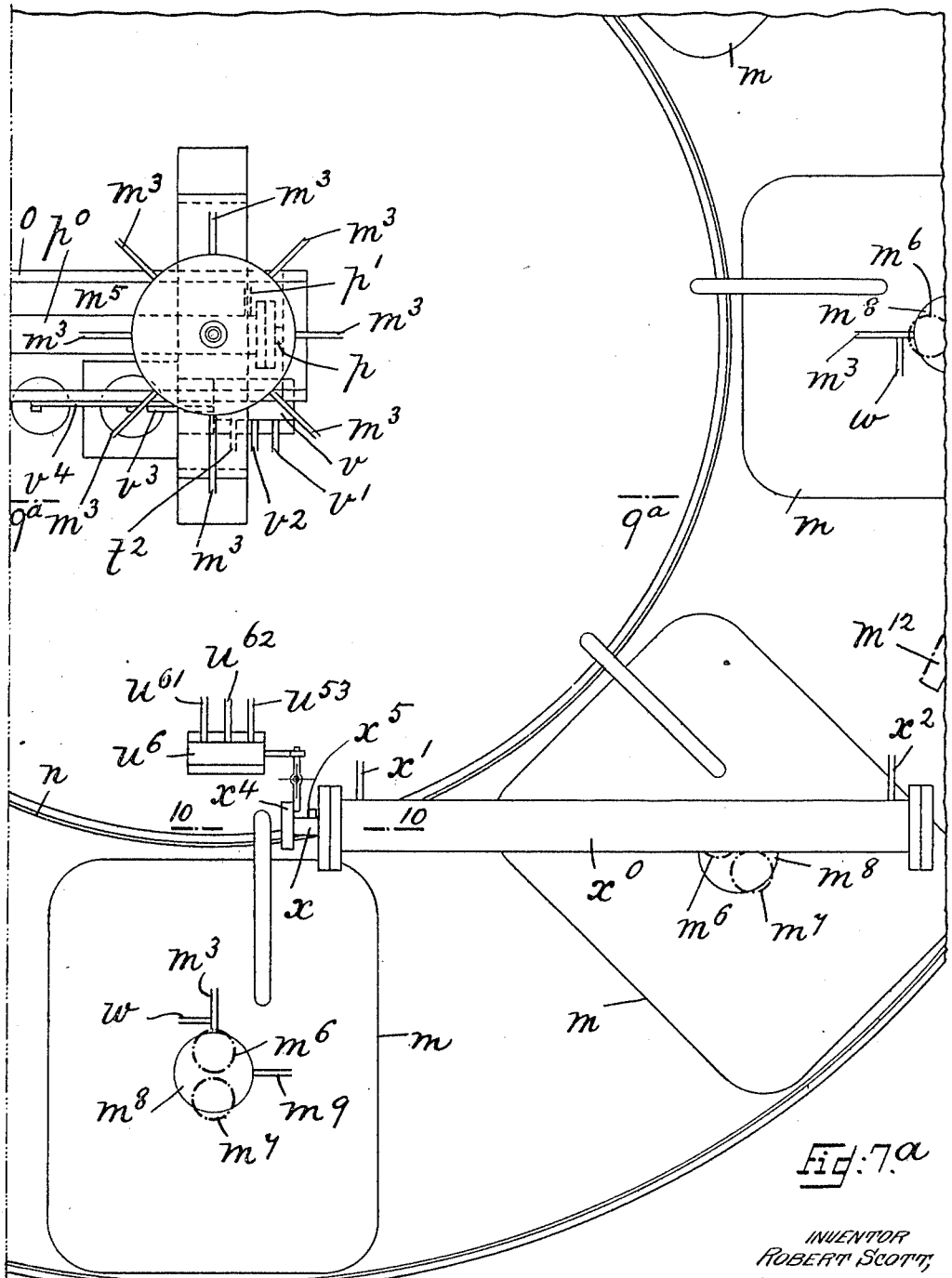

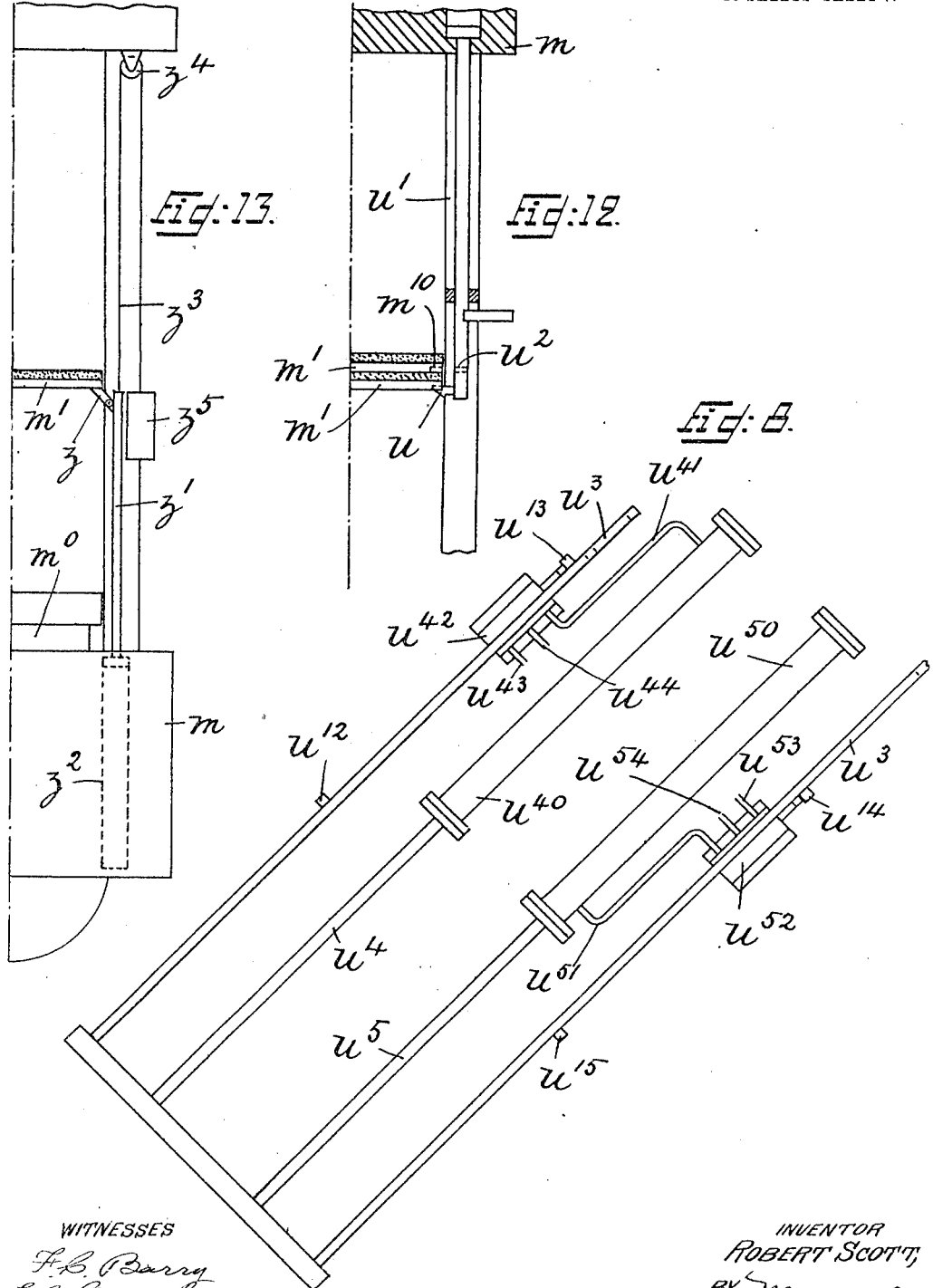

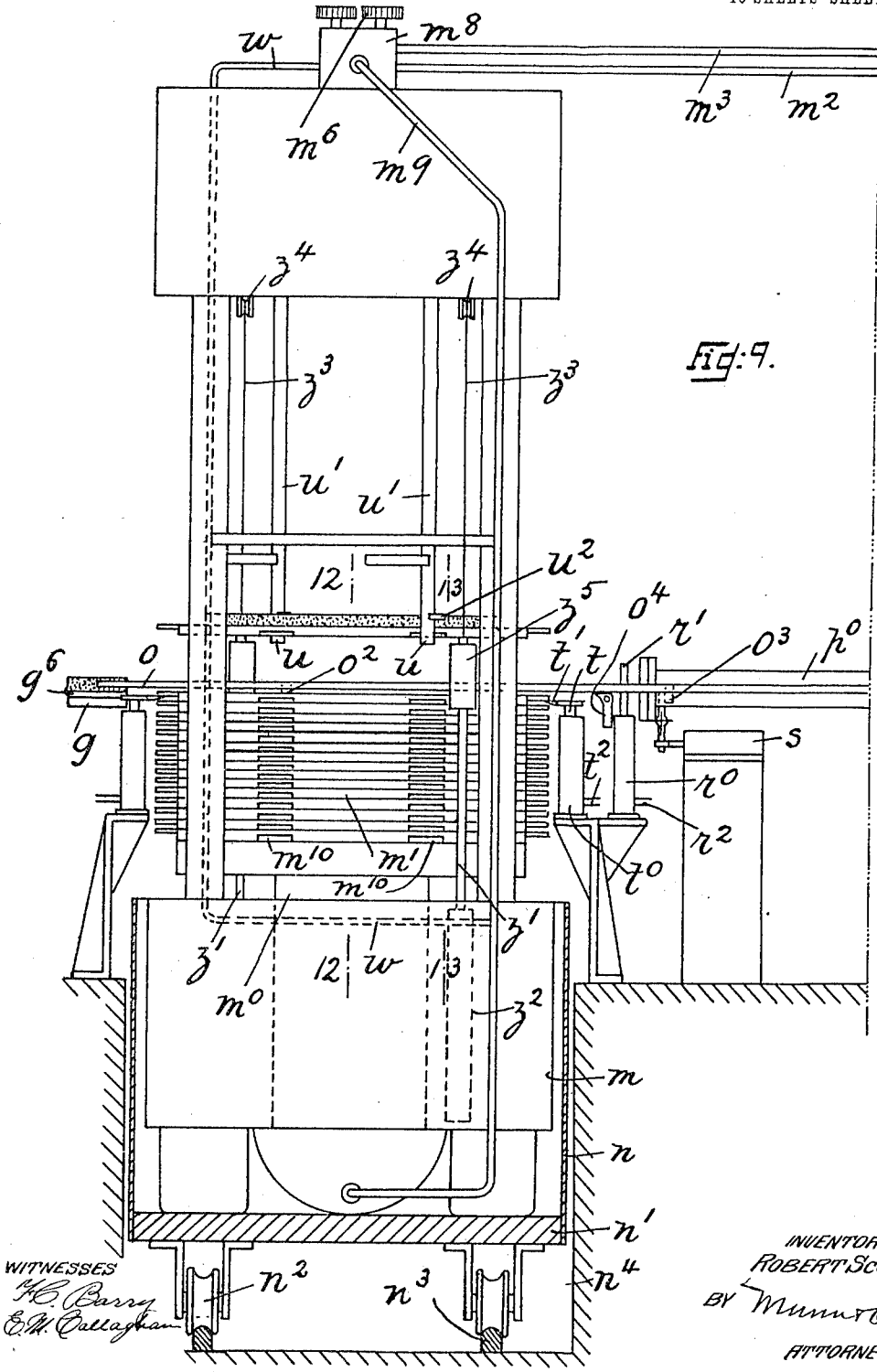

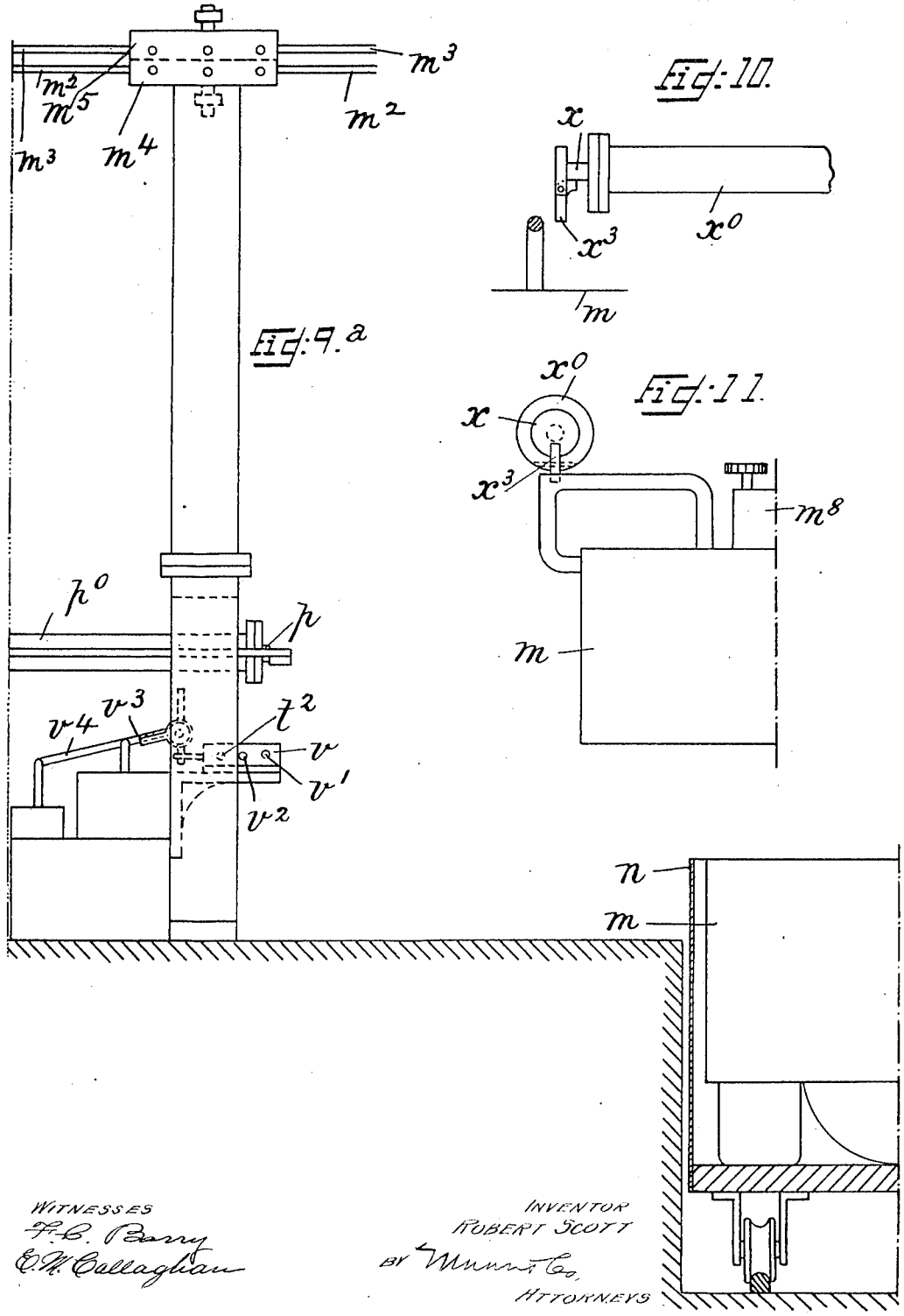

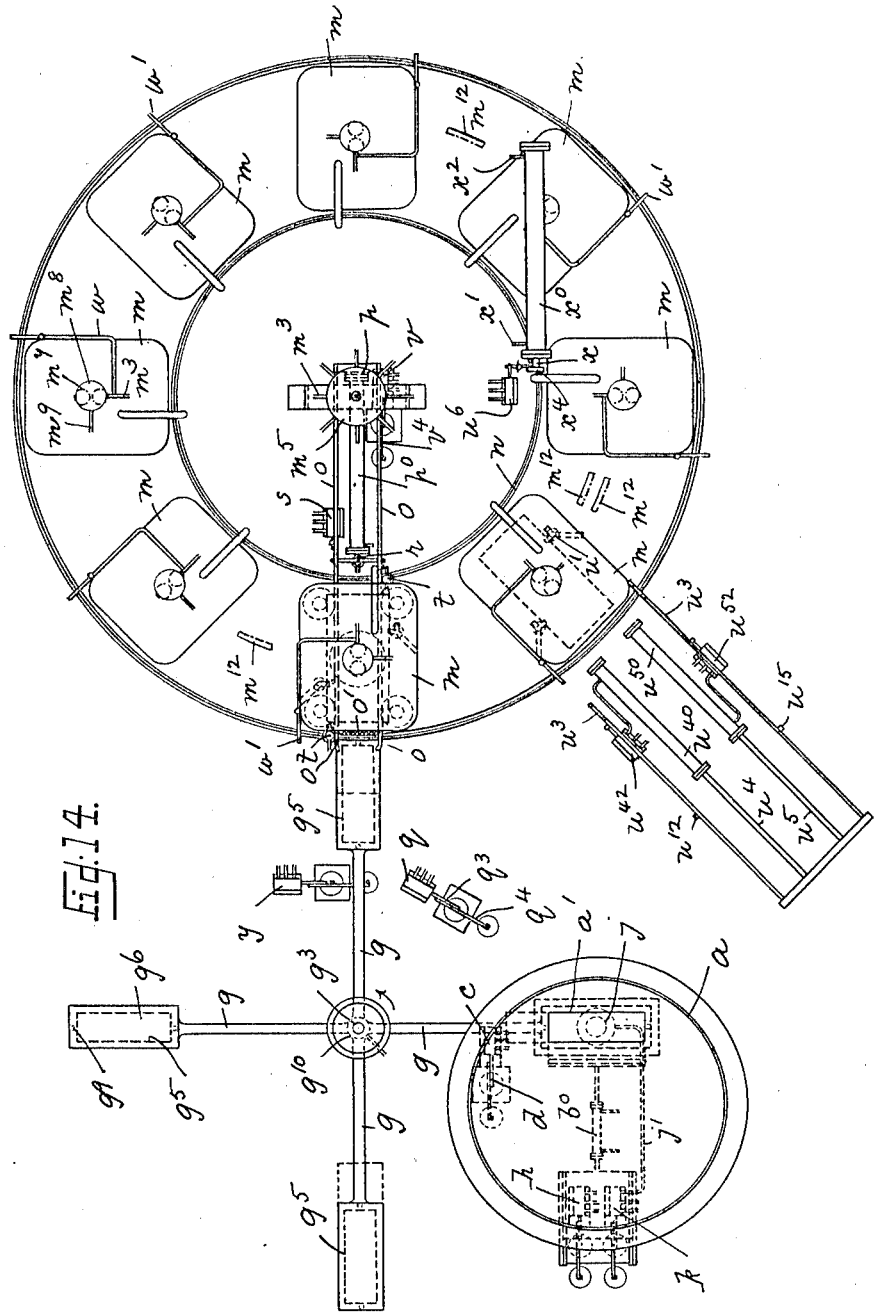

UNITED STATES PATENT OFFICE.

ROBERT SCOTT, OF LONDON, ENGLAND.

APPARATUS PARTICULARLY SUITABLE FOR TREATING OIL-SEED AND THE LIKE.

1,040,782.  Specification of Letters Patent.  Patented Oct. 8, 1912.

Application filed February 13, 1912. Serial No. 677,396.

*To all whom it may concern:*

Be it known that I, ROBERT SCOTT, a subject of the King of Great Britain and Ireland, and a resident of London, England, have invented certain new and useful Improvements in Apparatus Particularly Suitable for Treating Oil-Seed and the Like; and I do hereby declare the following to be a full, clear, and exact description of the same.

This invention relates to improvements in mill apparatus particularly suitable for treating oil seeds or the like, and has for its object to provide automatic means for delivering the material from the kettle or the like container to the molding press, performing the molding operation, and delivering each molded cake into convenient position for insertion into one of a series of oil expressing or other presses (hereinafter referred to as the presses), inserting each molded cake into its respective oil press, removing each loaded oil press from loading position and bringing an empty oil press into loading position, operating each loaded oil press to express the oil from the cakes, bringing each operated oil press to unloading position and presenting each oil expressed cake ready for removal; whereby greater regularity of working will be attained, manual labor and time will be saved, and waste of material and cost of production will be materially reduced, in comparison with existing mill systems or arrangements.

According to the present invention, a horizontal hydraulic ram for working the mold top slide at the bottom of the kettle is controlled by a valve closed by a cataract and allowed to open by a rotary frame carrying a series of vertically guided mold bottom plates and adapted to be driven through friction gearing so as to bring the bottom plates, on which the bags are placed by the operator, in succession beneath the mold box at the bottom of the kettle. The ram opens the top slide to allow the material to fall into the mold box onto the bagging on the respective bottom plate that is in position therebeneath and closes the top slide to imprison the charge within the mold box. The rotary frame is adapted to be raised and lowered by a vertical hydraulic ram controlled by a valve allowed to close by the closing of the top slide and opened by a cataract. In its raised position, the frame is adapted to engage a stop which arrests it in position with one of the bottom plates beneath the mold box, and in its lowered position, the frame disengages itself from the stop so as to be free to be turned to deliver a molded cake without the latter fouling the mold box. The molding action is effected by a second vertical ram controlled by a valve allowed to open by the closing of the top slide and closed by a cataract. In rising, the compressing ram passes through one of a series of recesses in the rotary frame beneath the bottom plates and aids in preventing the rotary frame from turning. As the ram passes through a recess, it engages and raises the respective bottom plate above the frame into the mold box and compresses the imprisoned charge. The valves controlling the frame ram and the compressor ram are arranged so that the frame is lowered at the same time as the compressor ram is raised and so that the latter alone then serves as the means for preventing the turning of the frame. Further these two valves are arranged so that the compressor ram descends below the frame leaving the bottom plate thereon with the molded cake on the plate and the frame free to turn before the frame rises, the latter movement taking place while the frame is turning.

Any suitable form of automatic folder may be applied for turning the ends of the bags over onto the molded cakes as the bottom plate is carried away from beneath the mold box. The turning movement of the frame transports each molded cake to one of a series of oil presses situate around a turntable and adapted to be brought one at a time into loading position at a convenient point on the borders of the radius of the frame.

The loading of the oil press is effected by a loading device comprising a pair of arms adapted to be brought into position to engage the bag of each molded cake on the frame and to draw each bag and cake onto a plate of the oil press, by a horizontal ram controlled by a valve closed by the frame and opened by a cataract. The engagement and disengagement of the loading arms with and from the bag is controlled by a vertical ram controlled by a valve opened and closed by the loading arms. Each plate of each oil press with the molded cake thereon is adapted to be lifted into engagement with detent devices in the upper part of the press by vertical rams controlled by a valve opened by the loading arms and closed by a cataract. The plates at the bottom of each oil press are brought to loading level for receiving the molded cakes by allowing a small quantity of liquid to feed into the cylinder of the main expressing ram through a branch from one of the pressure pipes, this branch being controlled by a valve opened and allowed to close by the frame. The turntable is given a part rotation to bring a loaded press out of loading position and an empty press into loading position by a horizontal ram controlled by a valve opened by the frame at the proper intervals and closed by a cataract. The cylinder of each main expressing ram is fed from overhead with low and high pressures from central boxes into which the mains from the accumulators pass. The low and high pressure conduits to each oil press are controlled by valves opened and closed from overhead. The unloading of each oil press is effected by the detent devices, which are adapted to allow the plates to drop one at a time, being operated by two rams controlled by two valves, each valve being opened and closed by its own ram and one valve being controlled by a third valve opened and closed by the turntable rotating ram. As each plate drops, it is caught by a lowering device which automatically descends under the weight of the plate until the latter rests on the main expressing ram or on the topmost one of the already lowered plates, and is then automatically disengaged and raised for receiving the next plate.

The invention is illustrated in the accompanying drawings, in which:—

Figures 1 and $1^a$ are a plan of part of a mill adapted according to the present invention; Fig. 2 is a section on the vertical plane 2—2 Fig. 1; Fig. 3 is a section on the vertical plane 3—3 Fig. 1; Fig. 4 is a detail view partly in section on 4—4, Fig. 1; Figs. 5 and 6 are detail views; Figs. 7 and $7^a$ are a plan of another part of a mill adapted according to the present invention; Fig. 8 is a detail of a part incompletely shown in Fig. 7; Figs. 9 and $9^a$ are sections on the vertical plane 9—9 Fig. 7, and $9^a$—$9^a$ Fig. $7^a$; Fig. 10 is a detail section on the vertical plane 10—10 Fig. $7^a$; Fig. 11 is an elevation at right angles to Fig. 10; Fig. 12 is a detail section on the vertical plane 12—12 Fig. 9; Fig. 13 is a detail section on the vertical plane 13—13 Fig. 9. Fig. 14 is a plan illustrating the completely assembled machine.

Like reference letters indicate like parts wherever repeated on the drawings.

$a$ is a steam jacketed kettle suspended or supported by any convenient means, not shown, so as to leave a clear space underneath for the frame hereinafter referred to to turn in.

$a^1$ is an outlet leading to the mold box $a^2$, at the bottom of the kettle, and $a^3$, is a slide for closing the top of the mold box.

The slide $a^3$, is connected to a hydraulic ram $b$, the cylinder $b^0$, of which has a port communicating by a conduit $b^1$, with an accumulator, and a port communicating by a conduit $b^2$, with a valve chamber $c$, having a port communicating by a conduit, $c^1$, with the accumulator, and an exhaust port $c^2$.

The valve chamber contains an ordinary D or other suitable valve adapted to open the conduit $b^2$, to the accumulator pressure or to the exhaust, $c^2$. The ram $b$, is made of different areas at its ends and so that when the valve is open the accumulator pressure passing through conduit $b^2$, opens the slide $a^3$, and when the valve is closed the accumulator pressure passing through conduit $b^1$, closes slide $a^3$, the pressure in conduit $b^2$, exhausting through conduit $c^2$.

The valve is connected to a rod, $c^3$, coupled to a bell crank lever $d$, pivotally mounted at $e$. A second bell crank lever $f$, is pivotally mounted at $e$, and is acted on by a weight $f^1$. The inclined arm of lever $f$, has a lug $f^2$, adapted to engage the inclined arm of lever $d$, so as to retain the valve in closed position. When, however, lever $f$, is moved so as to raise the weight and disengage the lug from lever $d$, (as hereinafter explained) the accumulator pressure opens the valve. The descent of the weight and the closing of the valve is controlled by a cataract $f^3$, which may be adjusted by a valve not shown.

$g$ is a frame consisting of a plurality of arms mounted on a vertical spindle $g^1$, serving as a ram and working in a hydraulic cylinder $g^{10}$, with facility of vertical movement. The spindle is slidingly coupled to a driving shaft $g^3$, mounted in bearings $g^{30}$, and driven from overhead by friction gearing $g^4$. Each arm at its outer end is enlarged and formed with a recess $g^5$; and the mold bottom plate $g^6$, is mounted above the recess and guided vertically by pins $g^9$. $a^4$ is a stop for engaging the arms so that the respective bottom plates $g^6$, are arrested in position beneath the mold box.

Each arm has a catch $g^7$, adapted, just before the arm comes to position beneath the mold box, to engage the vertical arm of the lever $f$, so as to disengage the lug $f^2$, from the lever $d$, and allow the valve in the chamber $c$, to open as aforesaid under the accumulator pressure.

The cylinder $g^{10}$, has a port communicating by a conduit $g^8$, with a valve chamber $h$. The valve chamber has a port communicating by a conduit $h^1$, with the accumulator, and an exhaust port $h^2$, and contains a valve adapted to open the conduit $g^8$, to the accumulator pressure or to the exhaust $h^2$. The valve is coupled to a bell crank lever controlled by a second bell crank lever and cataract similar to those above described, excepting that the valve is retained in open position by the bell crank, and is closed by a tumbler $b^3$, on a slide $b^4$, connected to the ram $b$.

$j$ is a ram for raising the bottom plates $g^6$, into the mold box $a^2$. This ram works in a hydraulic cylinder $j^0$, with facility of vertical movement. The cylinder has a port communicating by a conduit $j^1$, with a valve chamber $k$. This valve chamber has a port communicating by a conduit $k^1$, with the accumulator, and an exhaust port $k^2$, and contains a valve adapted to open the conduit $j^1$, to the accumulator pressure or to the exhaust $k^2$. The valve is operated similarly to the valve in the chamber $h$, excepting that the valve is retained in the closed position by bell cranks $h^3$, $h^4$, and is opened by a tumbler $b^5$, on the slide $b^4$.

In order to insure that the ram $j$, shall not rise and compress the material in the mold box before the slide $a^3$, is completely closed, the bell crank lever $h^3$, may be coupled to a rod $h^5$, guided as at $a^5$, and adapted to bear against the underface of slide $b^4$, excepting when slide $a^3$, is in the completely closed position, when rod $h^5$, can rise beyond the end of the slide $b^4$, Fig. 2. The descent of the ram $g^1$, may be similarly controlled to insure that the frame shall not descend before the ram $j$, rises.

In the raised position the ram $j$, engages the recess $g^5$, of the arm beneath the mold box and lifts the bottom plate $g^6$, into the mold box.

$m$ is a series of oil presses mounted in a tank $n$, on a rotary turntable $n^1$, supported by runners $n^2$, on rails $n^3$, in a well $n^4$. The turntable is so arranged and operated that while one arm $g$, is beneath the mold box $a^2$, the arm $g$, carrying the molded cake is opposite an oil press ready for insertion of the molded cake into the oil press.

$o$ is a pair of loading arms arranged just above the level of the plates $g^6$, and pivotally mounted at the inner ends on a ram $p$, working in a hydraulic cylinder $p^0$. The cylinder $p^0$, has a port communicating by a conduit $p^1$, with the accumulator, and a port communicating by a conduit $p^2$, with a valve chamber $q$. The valve chamber has a port communicating by a conduit $q^1$, with the accumulator and an exhaust port $q^2$, and contains a valve adapted to open the conduit $p^2$ to the accumulator pressure or to the exhaust $q^2$. The ram $p$, is made of different areas and so that when the valve is open the accumulator pressure passing through conduit $p^2$, moves the loading arms inward, and when the valve is closed the accumulator pressure passing through conduit $p^1$, moves the loading arms outward to the position shown in Figs. 7 and 9, the pressure in the conduit $p^2$, exhausing through port $q^2$. The valve is operated similarly to the valve in the chamber $c$, excepting that the valve is retained in the open position by bell cranks $q^3$, $q^4$, and is closed by a catch, $g^{11}$, on each arm of the frame $g$.

$r$ is a ram working in a hydraulic cylinder $r^0$, and carrying a wedge piece, $r^1$, adapted when the ram is raised to open apart the loading arms, $o$, which are closed together, when the ram is lowered, by a spring $o^1$. The cylinder $r^0$, has a port communicating by a conduit $r^2$, with a valve chamber $s$. The valve chamber has a port communicating by a conduit $s^1$, with the accumulator, and an exhaust port $s^2$, and contains a valve adapted to open the conduit $r^2$, to the accumulator pressure or to the exhaust $s^2$. The valve is opened by a catch $o^2$, on the loading arms and is closed by a catch $o^3$, thereon.

$m^1$ represents the plates of the oil press between which the cakes are pressed. These plates are brought to a common loading position level with the plates $g^6$, and just below the loading arms, as hereinafter explained.

$t$ represents rams working in a hydraulic cylinder $t^0$, and carrying detents $t^1$, adapted when the rams are raised to engage lugs on the plates $m^1$, and lift the top one of the plates, $m^1$, into engagement with detents $u$, at the lower ends of rods $u^1$, depending from the head of the oil press, and when lowered to engage underneath the top plate $m^1$. Each cylinder, $t^0$, has a port communicating by a conduit $t^2$, with a valve chamber $v$. The valve chamber has a port communicating by a conduit $v^1$, with the accumulator and an exhaust port $v^2$, and contains a valve adapted to open the conduit $t^2$, to the accumulator pressure or to the exhaust $v^2$. The valve is opened by a tumbler $o^4$, on the loading arms and is retained in closed position by bell cranks, $v^3$, $v^4$.

$w$ is a branch conduit leading from one of the pressure conduits, hereinafter referred to, to the cylinder of the main expressing ram, $m^0$, and $w^1$, is a valve in the conduit $w$, adapted to be opened and allowed to be closed by the hydraulic pressure, by the frame arms $g$, on their passing away from position in front of the oil press.

$x$ is a ram for turning the turntable, working in a hydraulic cylinder $x^0$, supported from overhead. The cylinder has a port communicating by a conduit $x^1$, with the accumulator and a port communicating by a conduit $x^2$, with a valve chamber $y$. The valve chamber has a port communicating by a conduit $y^1$, with the accumulator and an exhaust port $y^2$, and contains a valve adapted to open the conduit $x^2$, to the accumulator pressure or to the exhaust $y^2$. The valve is operated similarly to the valve in chamber $q$, being retained in the closed position by bell cranks $y^3$, $y^4$, and open by the catches $g^{11}$, excepting that any suitable form of trip gear is interposed so that only in every sixteenth (or other convenient number according to the number of plates in the oil press) operation will the valve be opened by the catches $g^{11}$. In moving outward, the ram $x$, by means of a tumbler, $x^3$, engages a frame on each of the presses in turn and turns the turntable to the extent of the distance between two oil presses.

$m^2$, $m^3$, are respectively low and high pressure conduits leading overhead to each oil press $m$, from central boxes, $m^4$, $m^5$, respectively, into the centers of which the low and high pressure mains from the accumulators pass with gland tight fit. The low and high pressure conduits are controlled by valves $m^6$, $m^7$, respectively, opened and closed by racks or equivalent means, $m^{12}$, supported from overhead. $m^8$ is the valve box into which the conduits $m^2$, $m^3$, open, and $m^9$, is a conduit for the low and high pressures leading to the cylinder of the main expressing ram.

The rods $u^1$, are adapted to oscillate about their axes, and are each provided with a catch $u^2$, which is so arranged that when the rods are oscillated only the bottom plate $m^1$, will drop, the other plates being supported by the catches $u^2$, and when the rods are restored to their normal position the remaining plates rest upon the detents $u$, and the catches $u^2$ are out of operation. The plates, $m^1$, are recessed as at $m^{10}$, to permit of the engagement of the catches $u^2$. The rods $u^1$, are caused to oscillate by tumblers on two unloading arms, $u^3$, connected by a cross head to two rams, $u^4$, $u^5$, working in hydraulic cylinders $u^{40}$, $u^{50}$ respectively.

The ram $u^4$ is for moving the unloading arms outward, and the ram $u^5$, is for moving the unloading arms inward. The cylinder $u^{40}$, has a port communicating by a conduit $u^{41}$, with a valve chamber $u^{42}$, and the cylinder $u^{50}$ has a port communicating by a conduit $u^{51}$, with a valve chamber $u^{52}$. The valve chamber $u^{42}$, has a port communicating by a conduit $u^{43}$, with the accumulator, and an exhaust port $u^{44}$, and contains a valve adapted to open the conduit $u^{41}$, to the accumulator pressure or to the exhaust $u^{44}$. The valve is opened by a catch $u^{12}$, and is closed by a catch $u^{13}$, on one of the unloading arms $u^3$. The valve chamber $u^{52}$ has a port communicating by conduit $u^{53}$ with a third valve chamber, $u^6$, and an exhaust port $u^{54}$, and contains a valve adapted to open the conduit $u^{51}$, to the valve chamber $u^6$, or to the exhaust $u^{54}$. The valve is opened by a catch $u^{14}$, and is closed by a catch $u^{15}$, on the other of the unloading arms $u^3$. The valve chamber $u^6$, has a port communicating by a conduit $u^{61}$, with the accumulator, and an exhaust port, $u^{62}$, and contains a valve adapted to open the conduit $u^{53}$ to the accumulator, or to the exhaust $u^{62}$. The valve is opened and closed by catches $x^4$, $x^5$, respectively on the ram $x$, so that the ram $u^5$, cannot be moved inward when the ram $x$, is rotating the turntable as it then closes the conduit $u^{53}$.

$z$ represents tumblers mounted on rods $z^1$, each working in a dashpot $z^2$ and normally held up by being connected by a cord $z^3$, passing over a pulley $z^4$, to a counterbalance $z^5$. When a plate is dropped as aforesaid, its weight on the tumbler $z$, overcomes the action of the counterbalance and the plate is lowered onto the ram $m^0$. As the tumbler passes the ram it is freed from the plate and is raised by the counterbalance.

It will be understood that in lieu of hydraulic pressure other suitable pressure might be used.

The operation of the apparatus is as follows: Speaking with particular reference to Fig. 2: The frame $g$, in its raised position and turning in the direction of the arrow (Fig. 1) has brought one arm beneath the mold box against the stop $a^4$. In coming to position the arm carrying the usual bag actuated the bell crank $f$, so that the slide $a^3$, opened to charge the mold box and closed to imprison the charge therein. The ram $j$, now rises to engage the recess $g^5$, and press the plate $g^6$, into the mold box while the frame $g$, descends Fig. 5. The ram $j$, then descends and redeposits the plate with the molded cake onto the lowered frame $g$, and then descends below the frame (Fig. 6), which is then free to turn under the action of the friction drive $g^4$ (Fig. 3), and while turning rises and stops and presents the molded cake to one of the oil presses $m$. Speaking now with particular reference to Figs. 7, 7$^a$: The arm $g$, carrying the molded cake in its bag, in coming to position closed the valve $q$, so that the loading arms $o$, were moved outward by the ram $p$. At the end of the outward movement of these arms, the catch $o^3$, closes the valve $s$, and the ram $r$, descends, and the loading arms $o$, close and engage the molded cake in its bag. The valve $q$, then automatically opens and the loading arms draw the molded cake and bag onto the topmost plate $m^1$. Toward the end of the inward movement of the arms $o$, the catch $o^2$, opens the valve $s$, and the ram $r$, rises and disengages the loading arms from the molded cake and bag. At the end of the inward longitudinal movement of the loading arms, the tumbler $o^4$, opens the valve $v$, and the lifting rams $t$, raise the molded cake and plate $m^1$, into engagement with the detent devices, $u$, which yield to allow the plate to be raised thereabove. The valve $v$, then closes and the rams $t$ descend. As the empty arm $g$, moves away from the loading position, it opens and allows to close the valve $w^1$, and the plates $m^1$, are brought to loading level again for receiving another molded cake. These operations are repeated until the press is full. The valve $y$, is then opened by the frame $g$, and the turntable is rotated one step by the ram $x$, and so on. As each loaded oil press is moved away from loading position, its low pressure valve is firstly turned on by one of the racks $m^{12}$, its high pressure valve is then turned on by another of the racks, and then both valves are turned off by two others of the racks. Each press in turn is then brought to unloading position, and the rods $u$, are oscillated by the unloading arms $u^1$, operated by the rams $u^4$, $u^5$, so that the plates $m^1$, drop one at a time on the tumblers, $z$, and are thereby lowered, and the expressed cakes and bags are hooked off by an operator.

What I claim as my invention and desire to secure by Letters Patent is:—

1. Apparatus for treating oil seed and the like comprising, in combination, a kettle or container having an outlet at the bottom, a mold box and a mold top slide beneath the opening, a raisable, lowerable and rotatable frame, a series of vertically guided mold bottom plates carried by the frame and adapted to be successively brought and arrested beneath the mold box and removed therefrom to any convenient position, driving means for turning the frame, and a hydraulic ram adapted to automatically raise and lower the frame, substantially as described.

2. Apparatus for treating oil seed and the like comprising, in combination, a kettle or container having an outlet at the bottom, a mold box and a mold top slide beneath the opening, a raisable, lowerable and rotatable frame, a series of vertically guided mold bottom plates carried by the frame and adapted to be successively brought and arrested beneath the mold box and removed therefrom to any convenient position, driving means for turning the frame, a hydraulic ram for operating the top slide, a valve automatically controlling said ram, a cataract, the valve being controlled by the rotary frame and by the cataract, and a hydraulic ram adapted to automatically raise and lower the frame, substantially as described.

3. Apparatus for treating oil seed and the like comprising, in combination, a kettle or container having an outlet at the bottom, a mold box and a mold top slide beneath the opening, a hydraulic ram for operating the top slide, a raisable, lowerable and rotatable frame, a series of vertically guided mold bottom plates carried by the frame and adapted to be successively brought and arrested beneath the mold box and removed therefrom to any convenient position, driving means for turning the frame, a hydraulic ram adapted to automatically raise and lower the frame, a valve for automatically controlling said ram, a ram for operating the top slide, and a cataract, the valve being controlled by the ram for operating the top slide and by the cataract, substantially as described.

4. Apparatus for treating oil seed and the like comprising, in combination, a kettle or container having an outlet at the bottom, a mold box and a mold top slide beneath the opening, a hydraulic ram for operating the top slide, a raisable, lowerable and rotatable frame, a series of vertically guided mold bottom plates carried by the frame and, adapted to be successively brought and arrested beneath the mold box and removed therefrom to any convenient position, driving means for turning the frame, a hydraulic ram adapted to automatically raise and lower the frame, a hydraulic ram for raising the bottom plates into the mold box and compressing the material, a valve for automatically controlling this ram, and a cataract, the valve being controlled by the ram for operating the top slide and by the cataract, and the ram for raising the bottom plates in its raised position being adapted to engage the frame so as to prevent the same from rotation, substantially as described.

5. Apparatus for treating oil seed and the like comprising, in combination, a kettle or container having an outlet at the bottom, a mold box and a mold top slide beneath the opening, a raisable, lowerable and rotatable frame, a series of vertically guided mold bottom plates carried by the frame and adapted to be successively brought and arrested beneath the mold box and removed therefrom to any convenient position, driving means for turning the frame, a hydraulic ram adapted to automatically raise and lower the frame, a rotary turntable, a series of oil presses thereon, and hydraulic means adapted to automatically remove the molded cakes from the rotary frame, load the presses therewith and rotate the turntable step by step as each press is loaded, substantially as described.

6. Apparatus for treating oil seed and the like comprising, in combination, a rotary turntable, a series of oil presses therearound, a rotary frame for automatically feeding the molded cakes to the oil presses, and hydraulic means for automatically loading the oil presses with the molded cakes, these means being controlled by the rotary frame, substantially as described.

7. Apparatus for treating oil seed and the like comprising, in combination, a rotary turntable, a series of oil presses therearound, a rotary frame for automatically feeding the molded cakes to the oil presses, hydraulic means for automatically loading the oil presses with the molded cakes, these means being controlled by the rotary frame, and hydraulic means for rotating the turntable step by step, these means also being controlled by the rotary frame, substantially as described.

8. Apparatus for treating oil seed and the like, comprising, in combination, a rotary turntable, a series of oil presses therearound, a rotary frame for automatically feeding the molded cakes to the oil presses, hydraulic means for automatically loading the oil presses with the molded cakes, these means being controlled by the rotary frame, a centrally arranged hydraulic main, and a conduit leading therefrom to each oil press, substantially as described.

9. Apparatus for treating oil seed and the like comprising, in combination, a rotary turntable, a series of oil presses therearound, a rotary frame for automatically feeding the molded cakes to the oil presses, hydraulic means for automatically loading the oil presses with the molded cakes, these means being controlled by the rotary frame, a centrally arranged hydraulic main, a conduit leading therefrom to each oil press, and means for automatically turning on and off the pressure, these means being controlled by the movement of the turntable, substantially as described.

10. Apparatus for treating oil seed and the like comprising, in combination, a rotary turntable, a series of oil presses therearound having a series of plates, detent devices at the upper parts of the oil presses, a rotary frame for automatically feeding the molded cakes to the oil presses, hydraulic means for automatically loading the oil presses with the molded cakes, these hydraulic means being controlled by the rotary frame, and hydraulic means for automatically operating the detent devices and lowering the oil press plates one at a time from the upper to the lower parts of the oil presses, these hydraulic means being controlled by the movement of the turntable, substantially as described.

In testimony whereof I affix my signature, in presence of two subscribing witnesses.

ROBERT SCOTT.

Witnesses:
ALFRED DAY,
WALTER DAY.

---

Copies of this patent may be obtained for five cents each, by addressing the "Commissioner of Patents, Washington, D. C."